July 27, 1948.  R. R. LOBOSCO  2,445,789
ELECTRICAL REGULATING SYSTEM
Filed Aug. 23, 1944  3 Sheets-Sheet 2
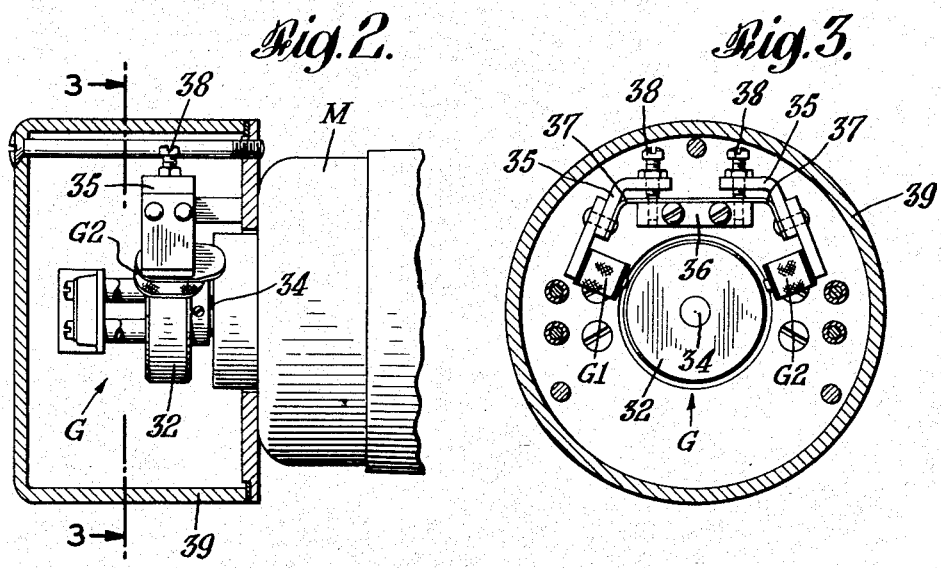
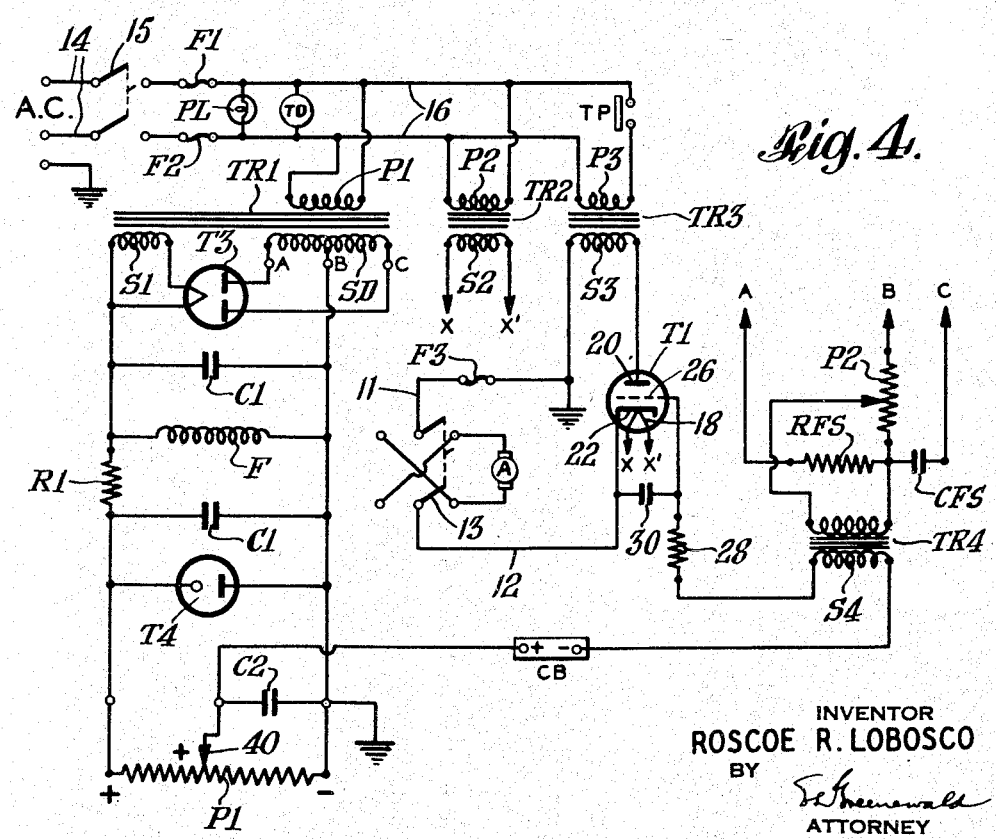
INVENTOR
ROSCOE R. LOBOSCO
BY
ATTORNEY Patented July 27, 1948

2,445,789

UNITED STATES PATENT OFFICE 2,445,789

ELECTRICAL REGULATING SYSTEM

Roscoe R. Lobosco, Elizabeth, N. J., assignor to The Linde Air Products Company, a corporation of Ohio Application August 23, 1944, Serial No. 550,731

4 Claims. (Cl. 314—64)

1

This invention relates to electrical regulating systems, and more particularly to electronic circuits adapted to maintain a variable characteristic at a substantially constant preselected value which is adjustable.

In many electrical regulating systems there is need for apparatus which controls energization of electrical circuits in accordance with a predetermined controlling influence, such as an electrical characteristic of an associated circuit or apparatus, to accomplish a desired controlling function. There exists, for example, a demand for motor control systems by which the speed of an electric motor may be regulated and maintained substantially constant within predetermined limits. There is also a great demand for highly sensitive control systems for automatic electric welding apparatus, in which the rate of movement of a movable electrode is coordinated with the rate of melting thereof by an electrode feeding motor, the operation of which is controlled by variations in the voltage drop between the electrode and the work. There is also a demand for voltage regulating systems in which the magnitudes of currents in control circuits are controlled in accordance with the voltage of an associated circuit or apparatus to effect the desired controlling or regulating operation. A number of electronic motor control circuits or units are now available. Some of such units have excellent characteristics with motors the rating of which is one horsepower or larger, but rather poor characteristics with smaller motors, unless the motor is designed especially for the purpose. However, none of such units is entirely suitable for use with motors of the series type.

In gas cutting and welding machines, small fractional horsepower motors are generally used to drive the blowpipe carriage. Such motors have ample torque to take care of any blowpipe carriage driving requirements, since the load is substantially constant and relatively small. High-speed series motors have characteristics which render them particularly suitable for driving gas cutting machines. Such motors, for example, have an excellent torque characteristic; they are light in weight and compact; can be obtained with attached speed reduction at reasonable cost; and have proven to be very reliable and trouble free. However, fractional-horsepower motor speed control circuits now available are not entirely suitable for precise adjustable speed control through a wide range of speeds.

It is, therefore, among the objects of this invention to provide a reliable, wide range, motor

2 speed control system that is suitable for fractional-horsepower high-speed motors, particularly those of the series type. However, the invention is not limited to the speed control of a fractional horsepower series motor, but is applicable to the control of both series and shunt motors of both fractional and integral horsepower ratings.

The speed control of series motors by electronic control circuits is difficult, because the speed-load characteristic of series motors is very poor and changes of as much as 200% in applied voltage are sometimes necessary to correct for large changes in load. Another object of this invention, therefore, is to provide an electronic control circuit having an unusually wide motor-speed adjustment range, which is capable of maintaining at any desired value the speed of a series or shunt motor regardless of wide changes in load and in line voltage, and which will remain in calibration for a relatively long time.

These and other objects of the invention will in part be obvious and in part become apparent from the following description.

According to the invention there is provided a power control device comprising at least one grid controlled gaseous discharge tube, such as a thyratron, having a grid or input circuit and an anode or output circuit. A motor is associated with such device so that the operation of the motor is controlled thereby. An alternating voltage derived from an alternating current supply circuit is applied to the anode circuit of the tube, while an alternating voltage also derived from such supply circuit is applied to the grid circuit in such manner that the grid voltage lags the anode voltage, causing the tube to fire by virtue of the phase relationship of such alternating voltages. A rectifier is connected to the supply circuit so as to energize an adjustable voltage divider or potentiometer having a direct current output circuit connected so as to superimpose a unidirectional grid biasing voltage on the alternating voltage applied to the grid circuit. Means responsive to the operation of the motor is arranged to supply direct current at a variable unidirectional voltage which varies according to a characteristic, such as the speed of the motor, the value of which is to be regulated, and a circuit is connected so as to superimpose such variable unidirectional voltage on the alternating voltage applied to the grid circuit, in potential opposition to the unidirectional grid biasing voltage of the voltage divider output circuit. The circuit arrangement is such that the motor is automatically operated to maintain a characteristic such as the speed of the motor at a preselected value dependent upon the adjustment of the voltage divider.

In the accompanying drawings:

Fig. 1 diagrammatically illustrates an embodiment of the invention as applied to a motor speed control system;

Fig. 2 is a view mainly in side elevation and partly in section of the motor and a two-phase generator;

Fig. 3 is a view in cross-section taken on line 3—3 of Fig. 2;

Fig. 4 is a circuit diagram of a modification of the invention as applied to the speed-control of a shunt motor.

Figure 1:
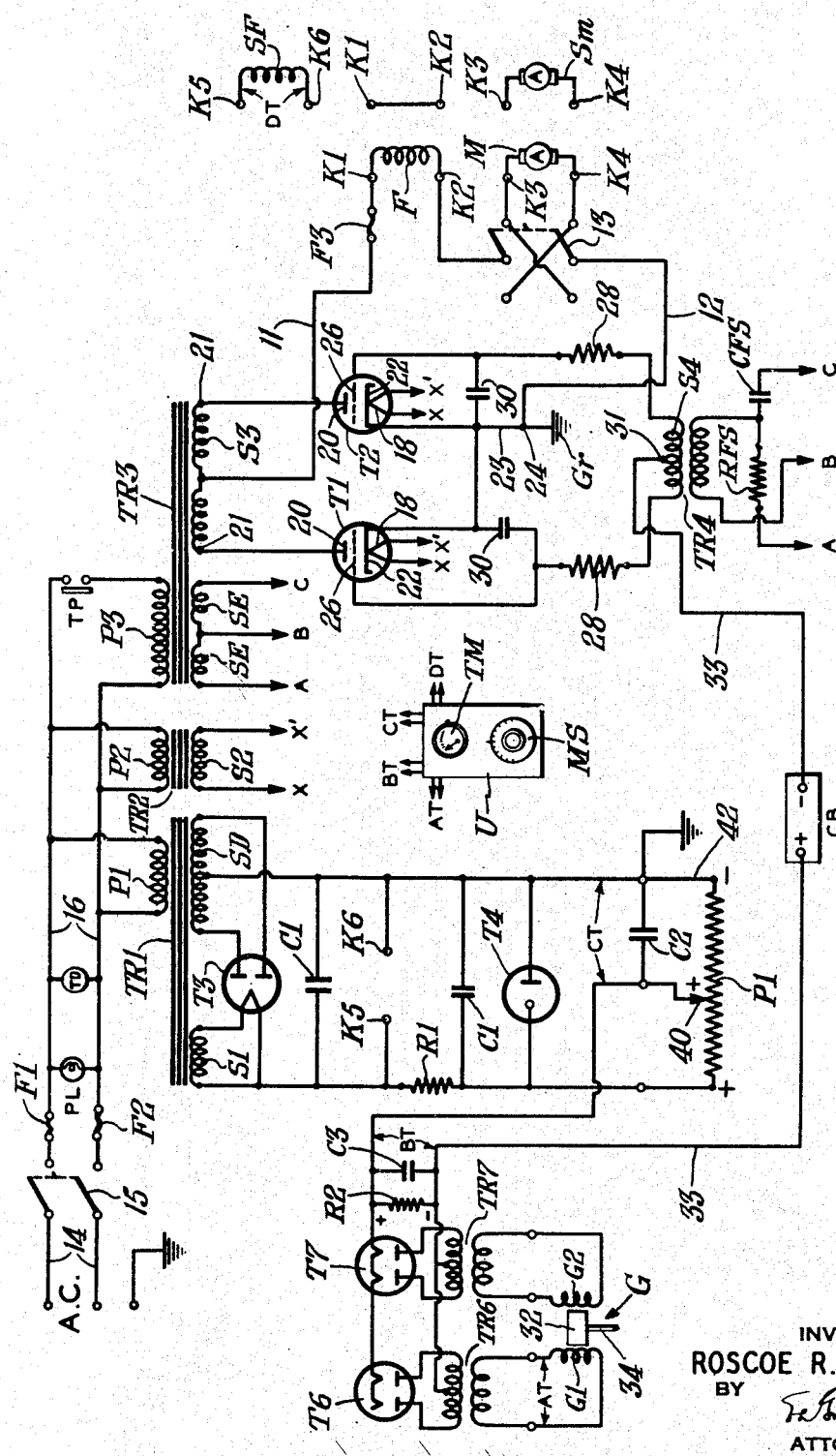

Referring to Fig. 1 of the drawing, the illustrated electronic control circuit includes a universal type A. C.-D. C. series motor M having an armature A and a field winding F. The motor M is connected to the common output circuit of a pair of suitable gaseous tubes such as thyratrons T1 and T2 by conductors 11 and 12, connections K1, K2, K3 and K4, and a reversing switch 13. The motor M drives an alternating current generator G, the entire control system being energized by an alternating current supply circuit 14. A control circuit 16 is connected to the supply circuit 14 by a switch 15, and safety fuses F1 and F2 are provided in the power supply conductors. A pilot light PL is connected across such conductors to indicate when the circuit 16 is energized.

Connected to the circuit 16 are the primary windings P1, P2 and P3 of transformers TR1, TR2, and TR3. The primary winding P3 is connected to the circuit 16 by a normally open switch TP of a time delay relay TD which is connected across such circuit. Upon closing the switch 15, the time delay relay TD is adapted to close the switch TP after a suitable time interval permitting the cathode heaters 18 of thyratrons T1 and T2 to become hot, such heaters being connected to the secondary winding S2 of transformer TR2 by conductors X, X'. Thus, transformer TR2 supplies the cathode heating power for the thyratrons T1 and T2.

Transformer TR3 supplies the motor power through the tubes T1 and T2. The anodes 20 of the thyratrons T1 and T2 are connected to opposite terminals 21 of the secondary winding S3 of the transformer TR3, the mid-point of such winding being connected to the conductor 11 which leads to the motor field winding F through a safety fuse F3. The cathodes 22 of thyratrons T1 and T2 are connected by a common circuit 23 to the conductor 12 leading to the motor armature A through the reversing switch 13, the connection 24 between circuit 23 and conductor 12 being grounded at Gr.

A rectifier tube T5 is employed as a conventional full wave rectifier to supply power to the field SF of a shunt wound motor Sm, if such a motor is used, through connections K5 and K6. When the series motor M is used, however, the connections K5 and K6 are, of course, unnecessary.

The transformer TR3 is provided with a pair of secondary windings SE having connections A, B and C with a resistor RFS and a condenser CFS, forming a phaseshift network which supplies to the control grids 26, 26 of the thyratrons T1 and T2, through a transformer TR4, an alternating voltage which lags the alternating voltage applied to the anodes 20, 20 of these tubes by a phase angle of the order of 90°. The secondary winding S4 of the transformer TR4 is connected at its opposite terminals to the control grids 26 through suitable resistances 28, 28, and to the cathodes 22 through condensers 30, 30.

The center tap 31 of the secondary winding S4 of transformer TR4 serves as a convenient means of superimposing on the alternating voltage, applied to the grids 26, a unidirectional grid biasing voltage in order to cause the output current of the thyratrons T1 and T2 to be increased or decreased in accordance with whether such unidirectional voltage is positive or negative.

The transformer TR1 supplies power to a potentiometer or voltage divider P1 through the full wave rectifier tube T5, the output circuit of which includes filter elements comprising a resistor R1 and condensers C1, C1 which act with a condenser C2 to smooth the pulsating direct current output of the rectifier tube T5. A gaseous-discharge type of voltage control tube T4 is connected across the output circuit of the rectifier tube T5 for the purpose of maintaining the unidirectional voltage across the voltage divider P1 constant regardless of voltage changes in the alternating current supply circuit 14, making the speed of the motor M constant regardless of line voltage variations or condition of the rectifier tube T5.

The alternating current generator G, which is driven by the motor M through shaft 34, preferably comprises field coils G1 and G2 having a two-phase output voltage which is proportional to the speed of the motor. The output current of the coils G1 and G2 is fed to voltage step-up transformers TR6 and TR7. The secondary current of such transformers is rectified by full wave rectifier tubes T6 and T7 and energizes a resistor R2. A condenser C3 is connected across the resistor R2 to smooth the rectified generator voltage which is applied to such resistor R2. The negative terminal of the resistor R2 is connected to the center tap 31 of the transformer winding S4 by a conductor 33 containing a source of negative bias voltage, such as a "C" battery CB.

The generator G is of the two-phase type because the rectified voltage output thereof has a much smaller percentage of ripple than that of a single-phase generator and rectifier, less ripple is present in the former than in the latter. Smoother operation and lower motor speeds are obtained with a two-phase generator than with a single-phase generator. However, a single-phase generator may be used if desired.

Referring particularly to Figs. 2 and 3, there is illustrated a suitable two-phase generator G comprising an armature consisting of a 4-pole magnet 32 mounted on the shaft 34 of motor M. The generator field coils G1 and G2 are adjustably mounted on a bracket 36 by flexible arms 37, the gap between the four-pole magnet 32 of the generator coils G1 and G2 being changed by means including levers 35 and long fillister-head screws 38, 38. The gaps between the armature and field coils are adjusted so that the output voltage of each of the two coils is equal to a desired value. The governor parts are simple to make and have very wide tolerances since the gap adjustment feature takes care of any manufacturing variations in the parts. The generator is provided with a suitable housing 39 supported by the frame of the motor M.

In addition to low cost and simplicity the alternating current generator or tachometer G and rectifier T6, T7 have other advantages. Where an alternating current tachometer or generator and rectifier are used, according to the invention, the tachometer leads AT need not be reversed when the motor M is reversed. When a dirct current tachometer or generator is used it is necessary to reverse both the motor and the tachometer leads. Since in this latter case, both control leads and power leads are involved, the reversing of the motor is much more complicated.

An examination of the circuit illustrated by Fig. 1 will show that the sum of the rectified generator voltage appearing across the resistor R2, and the speed control voltage appearing across the output terminals 40 and 42 of the voltage divider P1, is superimposed on the negative bias voltage and the alternating voltage appearing on the control grids 26 of the thyratrons T1 and T2. A further examination of the circuit will show that the polarity of the speed control voltage is such that it applies a positive unidirectional voltage on the grids of the thyratrons, while the polarity of the rectified generator voltage is such that it applies a negative unidirectional voltage on the grids of the thyratrons. The actual unidirectional voltage superimposed on the grids 26 is the algebraic sum of such two voltages and that of the "C" battery CB.

Thus, when the switches 13 and 15 are closed to start the motor M, the generated voltage will be zero and there will be a high positive unidirectional voltage superimposed on the alternating voltage of the grids of the thyratrons, which in effect causes the phase of the alternating voltage applied to the grids to shift so that maximum current flows through the field F and armature A of the motor M. Such positive voltage is bucked by the negative bias voltage of battery CB, so that the motor will operate at a relatively low minimum speed. As the motor armature A comes up to the preselected speed the rectified generator voltage appearing across the resistor R2 increases until it approaches the value of the speed control voltage across the terminals 40 and 42 of the voltage divider P1, causing the phase of the grid voltage gradually to shift and finally stabilize at a value which delivers to the motor M such power that the rectified generator voltage is substantially equal to the speed control voltage. Any tendency for the motor armature A to shift in speed causes a change in the generated voltage which, in turn, causes the grid phase to shift in such direction that the change in current to the motor caused by this phase shift brings the motor back to the selected speed. The speed of the motor may be adjusted to any predetermined value through a relatively wide range by adjusting the position of the positive terminal 40 of the voltage divider P1. For some applications and under certain conditions a circuit using a single thyratron is satisfactory.

The speed of the motor armature A may be indicated by a meter-type tachometer TM, which can be connected to the circuit in any one of several places for example, a voltmeter, calibrated in any suitable manner to indicate the speed of the motor or a member, such as the blowpipe driven thereby, may be connected by conductors AT across one of the generator coils G1 of the generator G. Likewise, a voltmeter may be connected by conductors BT across the resistor R2, the unidirectional voltage across such resistor being proportional to the speed of the generator G as well as that of the motor M. Similarly, a voltmeter may be connected by conductors CT across terminals 40 and 42 of the voltage divider P1 to indicate the speed control voltage that is applied to the input circuit of the thyratrons T1 and T2. Also a voltmeter may be connected by conductors DT across the shunt field winding SF to test the operation of the tube T3. The meter TM itself may be located in any desired position. If desired, the meter may be provided in a unit U with a multipoint switch MS, so that it may be connected at will to any desired part of the system for testing various parts of the system, for example, the operation of the generator coil circuit AT, the generator rectifier circuit BT, the speed adjustment circuit CT, the thyratron tubes, the motor field supply circuit DT, and as a tachometer, the meter TM being suitably calibrated for such indications. Thus, the entire circuit can be checked quickly by moving single switch MS to each of several positions in quick succession and noting the meter readings. Thus, any trouble may be located without the use of complicated test equipment and without any knowledge of the system by the person doing the testing, by merely following a few simple instructions.

The speed control potentiometer or voltage divider P1 can be located in any desired position and, if necessary or desirable, a plurality of voltage dividers or potentiometers may be connected into the circuit to operate as desired. Since such units are inexpensive and require only a small three-wire lead, several of them may be located at convenient points about the machine without appreciably increasing the cost of the system. The electronic power control device comprising one or two thyratrons may also be located wherever desired. Thus, the four major units of the present system, i. e. the speed adjustment means P1, the tachometer TM, the motor M, and the electronic device T1, can be placed in any desired location with respect to one another without interfering with the operation of the system.

The circuit shown in Fig. 1 may be varied or simplified in a number of ways, for example:

1. A single generator coil and a single rectifier tube can be substituted for the two-phase generator and two rectifier tubes with some sacrifice in performance at low motor speeds.

2. A direct current tachometer generator can be connected directly across the resistor R2, in which case the two-phase generator system, the two associated transformers and the two rectifier tubes may be omitted.

3. When the back electromotive force of a shunt wound motor is used in place of a generator, the two step-up transformers TR6 and TR7 and two rectifier tubes T6 and T7 are omitted.

4. Instead of two thyratrons operating as a full wave rectifier, a single thyratron operating as a half-wave rectifier may be used.

5. The voltage control tube T4 in the speed control circuit can be eliminated provided line voltage variations do not cause any trouble.

By taking full advantage of the foregoing simplifications, it is possible to obtain good performance with a simplified circuit using only two tubes for a shunt motor and only three tubes for a series motor.

A shunt motor with fixed field excitation generates a back electromotive force that is proportional to the speed of the motor. Therefore, it is possible to make use of such electromotive force to control the speed of the motor. Fig. 4 shows how this may be accomplished according to the present invention. In such system, in which corresponding parts have the same reference characters as Fig. 1, a single thyratron T1 supplies half-wave current to the shunt motor armature A, the shunt field F of the motor being connected across the output circuit of the rectifier T3, the back electromotive force of the armature opposes the voltage of the potentiometer P1. Another potentiometer P2 is employed in the phase shifting network to provide means for adjusting the phase shift voltage. The single rectifier tube T3 supplies both the motor field current and the unidirectional control voltage. The system illustrated in Fig. 4 otherwise is like that shown in Fig. 1 and operates in substantially the same manner as that described above in connection with Fig. 1 except that the generator G is dispensed with, and the back electromotive force generated by the motor armature winding A is employed to match the unidirectional voltage output of the voltage divider P1. This circuit has been found to give unusually good performance.

With a series motor circuit, according to the invention, the generated voltage is proportional to the speed of the motor regardless of line voltage variations. However, were it not for the voltage control tube T4 the speed control voltage would vary with line voltage variations and thus cause the motor speed to change with line voltage variations. Therefore, the use of the voltage regulator tube to maintain the speed control voltage at the adjusted value, according to the invention, makes the speed of the series motor substantially independent of line voltage variations.

With a shunt motor circuit the motor counter electromotive force will vary if the motor field strength varies. Therefore, the field should be maintained well saturated so that normal line voltage variations will not affect such counter electromotive force. The combination of a well saturated field and the voltage regulator tube T4, according to the invention, makes the speed of the shunt motor substantially independent of the line voltage variations. Since the motor speed is substantially independent of motor load and line voltage, and since the motor speed is a function of the speed control voltage, a suitably calibrated voltmeter TM connected across circuit CT, Fig. 1, so as to be responsive to the speed control voltage applied to the grid of the thyratron, provides an accurate indication of the motor speed or a characteristic which is proportional to such speed.

Figure 5:
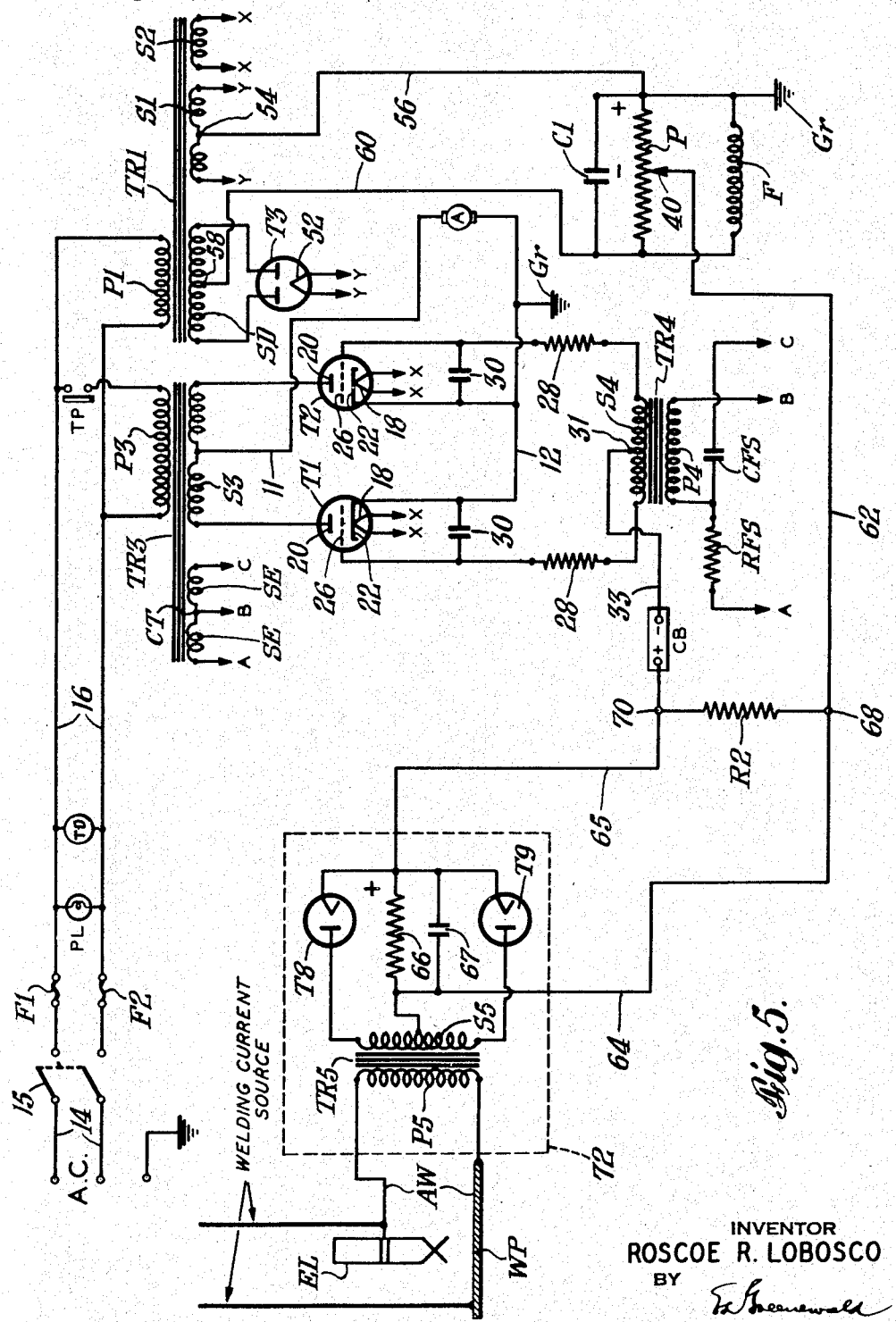
Fig. 5 illustrates an embodiment of the invention as applied to an electrode feed-control system for arc welding.

Figs. 1 through 4 illustrate how the speed of a shunt or series motor is maintained constant at any desired value regardless of load or line voltage changes by making use of a generated voltage that is proportional to the speed of the motor. However, the principles of the invention may be used in a rod or electrode feed control system for arc welding by connecting the arc circuit in place of the generator coils and reversing the potential of the rectified voltage and the speed control voltage. The voltage divider is then adjusted to the desired arc voltage, and the rod feed motor will adjust itself to maintain the work voltage at that value. Fig. 5 illustrates a system for accomplishing this result. In a similar manner the output of a photocell, an amplifier, or any other device which will deliver a voltage which is proportional to some desired characteristic, can be connected to the resistor R2, to cause the motor speed to vary in such manner as to keep the value of such characteristic constant. The invention can also be used to control the speed of a shaft receiving its torque from a motor by using the system to control a magnetic coupling between the motor and the shaft.

Referring to Fig. 5, the primary winding P5 of a transformer TR5 is connected across an arc welding circuit AW including a welding rod or electrode EL and a work-piece WP. The electrode is fed toward the work-piece by a shunt motor having an armature A and a field winding F. The armature A is included in the output circuit 11, 12 of the thyratrons T1 and T2. The switch TP is closed by the time delay relay TD, energizing the primary winding P3 of transformer TR3.

The dual secondary winding S3 of the latter energizes the output circuit 11, 12 of the thyratrons T1 and T2 and the motor armature with rectified current the value of which is controlled by the voltage applied to the thyratron control grids 26. Alternating voltage is applied to the grids 26 by transformer TR4, the opposite terminals of the secondary winding S4 being connected to the grids through resistors 28. The phase of the alternating voltage applied to the grids 26 is caused to lag that of the alternating grid voltage by an angle of the order of 90°, by a phase-shifter circuit including a resistor RFS and a capacitor CFS in the circuits A and C, respectively, which connect to opposite terminals of the transformer secondary windings SE. One terminal of the primary winding P4, connects to the common terminal CT of the secondary windings SE, the other being connected to the common connection of RFS and CFS. The cathode heaters 18 of the tubes T1 and T2 are energized by the secondary winding S2 of transformer TR1 through conductors X, X.

The motor field F winding is energized with rectified current from the full-wave rectifier tube T3 which is in turn supplied with alternating current by the transformer TR1 having primary winding P1 and secondary winding SD. The cathode 52 of the tube T3 is energized by secondary winding S1, the mid-terminal 54 of the latter being connected by conductor 56 to one terminal of the motor field winding F, which is grounded at Gr, and the mid-terminal 58 of the winding SD being connected by conductor 60 to the other terminal of the field winding. Voltage divider P is connected across the motor field winding F. Capacitor C1 is also connected across such winding to smooth out current ripples. The adjustable tap 40 of the voltage divider P is connected to resistor R2 by conductor 62. Such tap may be provided with a scale calibrated in welding-arc voltage units.

The resistor R2 is also connected by conductors 64 and 65 to the direct current output circuit of rectifier tubes T8 and T9 which are energized by the secondary winding S5 of transformer TR5. The output circuit of the tubes T8 and T9 includes a load resistor 66 and a current smoothing condenser 67. Thus, the unidirectional voltage applied to the terminals 68 and 70 of the resistor R2 by the conductors 64 and 65 is proportional to the alternating welding voltage between electrode EL and work-piece WP. In case a direct current welding arc is used, the parts shown in the dotted-line box 72 are omitted and the positive welding electrode is connected to terminal 70 and the negative welding electrode, to terminal 68 of resistor R2.

The terminal 70 of resistor R2 is connected by the circuit 33 including the source CB of bias voltage to the mid-top 31 of the secondary winding S4 of transformer TR4. This bias voltage increases the range of arc-welding potential adjustment of the rod-feed motor, by decreasing the minimum speed of the motor.

In the operation of the system shown in Fig. 5, the power supplied to the rod-feed motor armature A by the thyratrons T1 and T2 is automatically varied so as to keep the arc-welding voltage constant. The value of the latter is determined by the adjustment of the tap 40 of the voltage divider P. The unidirectional voltage applied to the grids 26 by virtue of resistor R2 from the arc voltage rectifier tubes T8 and T9 tends to increase the rod-feed, which decreases the unidirectional voltage applied to the grids 26 by virtue of resistor R2 from the output circuit of the rectifier tubes T8 and T9. Thus, the arc-welding voltage is kept constant, any incremental change in the latter being met by a compensatory change in the operation of the motor.

Let it be assumed that the unit is ready to operate and that an arc has been struck. The rectifier tubes T8 and T9 supply to the grids of tubes T1 and T2 a positive voltage proportional to the arc voltage. Therefore, the actual D. C. potential on the grids of the tubes T1 and T2 will be the algebraic sum of the negative bias voltage supplied by the voltage divider P and the positive voltage supplied by the arc voltage rectifiers T8 and T9. In normal operation these two voltages are nearly equal. If the arc voltage is greater than the desired value, then the algebraic sum of these two voltages will tend to make the grid more positive which will cause the phase of the grid voltage to shift so as to increase the motor current which will in turn reduce the arc gap and therefore, the arc voltage. Similarly if the arc voltage is less than is desired the algebraic sum of these voltages will tend to make the grids more negative and thus shift the phase of the grid voltage so as to reduce the motor current and therefore the motor speed thus causing the arc gap and the arc voltage to increase.

I claim:

1. An electrical regulating system for smoothly controlling the rate of rod feed in a welding machine including a direct current rod-feed motor, such system comprising the combination of at least one thyratron, means for supplying an alternating voltage to the input circuit of said thyratron, means for passing the rectified current output of the thyratron through the armature of the rod-feed motor, and means for selectively regulating the welding voltage, including means for applying to the grid of said thyratron, an alternating voltage lagging the plate voltage of the thyratron by approximately 90 degrees, a unidirectional positive voltage proportional to the actual welding voltage, and a unidirectional negative voltage proportional to the desired welding voltage.

2. In combination, at least one grid-controlled gaseous-discharge tube having a grid circuit and an anode circuit, a welding rod feed motor associated with said tube so that the speed of said motor is controlled thereby, means for applying an alternating voltage derived from an alternating current supply circuit to the anode circuit of said tube, means for applying an alternating voltage derived from said supply circuit to the grid circuit of said tube which grid voltage lags the anode voltage by a fixed angle of approximately 90 degrees, an adjustable voltage divider, means connecting said voltage divider to a source of direct current, said voltage divider having a direct current output circuit connected so as to superimpose a unidirectional negative voltage on the alternating voltage applied to said grid circuit, a resistor, means including a welding circuit the voltage of which is responsive to the speed of said motor for supplying direct current to said resistor so that the unidirectional voltage across said resistor varies according to the actual welding voltage between such rod and the work, and a control circuit connected to said resistor so as to superimpose such variable unidirectional voltage on the alternating grid voltage applied to said grid circuit in opposition to the unidirectional negative voltage of said voltage divider output circuit, so that the speed of said motor is automatically controlled without stoppage of the motor to maintain such rod-work welding voltage at a preselected substantially constant value dependent upon the adjustment of said voltage divider.

3. An electrical regulating system for maintaining substantially constant the speed of a direct current motor, which speed is adjustable, comprising the combination of an electronic speed control circuit of the type in which a voltage responsive to the actual motor speed is matched by a reference voltage which is adjustable to set the motor speed to a desired value, and the difference between such voltages maintains such speed constant at the desired value, and a voltmeter connected to such circuit so as to be responsive to such reference voltage, and calibrated to indicate a function of the motor speed, so that the desired value of such function can be preset by adjusting such reference voltage to correspond to the value of the function indicated by said voltmeter before the motor is started.

4. An electrical regulating system for maintaining substantially constant the speed of a direct current motor, comprising the combination of means for supplying an alternating voltage to the input circuit of a thyratron, means for passing the rectified current output of the thyratron through the armature of the said motor, and means for selecting the desired speed at which the motor will operate, including means for applying to the grid of the thyratron a unidirectional negative voltage proportional to the actual speed of the motor, an alternating voltage of fixed value lagging the plate voltage by approximately 90 degrees, a negative unidirectional voltage of fixed value which determines the minimum speed of the motor, and a unidirectional positive voltage proportional to the desired speed of the motor, and a voltmeter connected to measure such unidirectional positive voltage, and thus indicate the selected motor speed before, and after, as well as during the running of the motor.

ROSCOE R. LOBOSCO.

REFERENCES CITED

The following references are of record in the file of this patent:

UNITED STATES PATENTS

| Number | Name | Date |
| --- | --- | --- |
| 2,120,109 | Merrill | June 7, 1938 |
| 2,229,448 | Garman | Jan. 21, 1941 |
| 2,235,551 | Garman | Mar. 18, 1941 |
| 2,254,899 | Laubenheimer et al. | Sept. 2, 1941 |
| 2,260,510 | Clapp | Oct. 28, 1941 |
| 2,264,333 | Satterlee | Dec. 2, 1941 |
| 2,287,459 | Uehling | June 23, 1942 |
| 2,348,259 | Kratz | May 9, 1944 |